United States Patent [19]

Lowry et al.

[11] Patent Number: 5,184,255

[45] Date of Patent: * Feb. 2, 1993

[54] VIDEO TAPE CASSETTE WITH A REUSABLE RECORDING ENABLE/DISABLE SLIDE TAB

[75] Inventors: Alan B. Lowry, Canton, Mass.; Paul J. Gelardi, Cape Porpoise, Me.; Donald R. Rochelo, Pittsfield, Mass.

[73] Assignee: Shape Inc., Biddleford, Me.

[*] Notice: The portion of the term of this patent subsequent to Oct. 2, 2006 has been disclaimed.

[21] Appl. No.: 3,761

[22] Filed: Jan. 16, 1987

[51] Int. Cl.⁵ .................. G11B 15/04; G11B 23/02
[52] U.S. Cl. ................................ 360/60; 360/132
[58] Field of Search ........................... 360/60, 132

[56] References Cited

U.S. PATENT DOCUMENTS

| | | |
|---|---|---|
| 3,320,030 | 4/1983 | Shiba . |
| 3,826,489 | 7/1974 | Watkins . |
| 3,828,363 | 8/1974 | Somers ................................ 360/60 |
| 3,848,265 | 11/1974 | Biery et al. . |
| 3,950,786 | 4/1976 | Shapley . |
| 4,012,011 | 3/1977 | Saito ................................ 360/132 |
| 4,041,537 | 8/1977 | Kishi . |
| 4,044,386 | 8/1977 | Satou et al. . |
| 4,173,319 | 11/1979 | Umeda . |
| 4,320,421 | 3/1982 | Larson et al. . |
| 4,320,422 | 3/1982 | Rinkleib . |
| 4,399,481 | 8/1983 | Loranger et al. . |
| 4,409,630 | 10/1983 | Saito . |
| 4,460,930 | 4/1984 | Takahashi . |
| 4,484,248 | 11/1984 | Ogiro et al. . |
| 4,496,999 | 1/1985 | Espin ................................ 360/60 |
| 4,507,692 | 3/1985 | Sasaki . |
| 4,530,017 | 7/1985 | Oishi et al. . |
| 4,536,812 | 8/1985 | Oishi et al. . |
| 4,549,240 | 10/1985 | Hodges . |
| 4,564,871 | 1/1986 | Cybulski . |
| 4,607,299 | 8/1986 | Oishi et al. ............................ 360/60 |
| 4,618,060 | 10/1986 | Tarter . |
| 4,665,456 | 4/1987 | Ahlberg et al. . |
| 4,685,017 | 8/1987 | Swinburne et al. ................... 360/60 |

FOREIGN PATENT DOCUMENTS

| | | |
|---|---|---|
| 48876/79 | 8/1983 | Australia . |
| 45184/85 | 1/1989 | Australia . |
| 0185364 | 6/1986 | European Pat. Off. . |
| 49-126014 | 2/1974 | Japan . |
| 47-84501 | 4/1974 | Japan . |
| 44-35213 | 9/1975 | Japan . |
| 45-42304 | 9/1975 | Japan . |
| 45-35998 | 9/1976 | Japan . |
| 50-119322 | 2/1977 | Japan . |
| 56-99685 | 8/1981 | Japan . |
| 2163409 | 2/1986 | United Kingdom . |
| 81/01907 | 7/1981 | World Int. Prop. O. . |

Primary Examiner—Wayne R. Young
Assistant Examiner—Won Tae C. Kim
Attorney, Agent, or Firm—Staas & Halsey

[57] ABSTRACT

A write enable tab is repeatedly movable from a first position, enabling writing on a signal storage unit, to a second position, disabling writing thereon. The write enable tab preferably includes a central body and a flexible member which exert force against first and second walls of a tape cassette shell. The flexible member is attached at a first end to the central body. A second end of the flexible member projects into first and second depressions in the first wall when the central body is in the first and second positions, respectively.

27 Claims, 4 Drawing Sheets

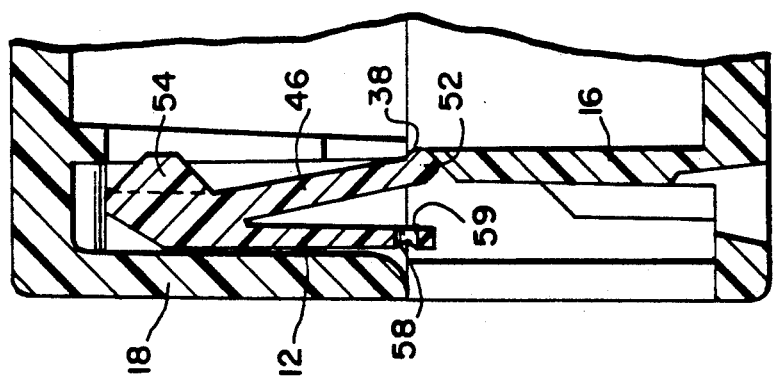
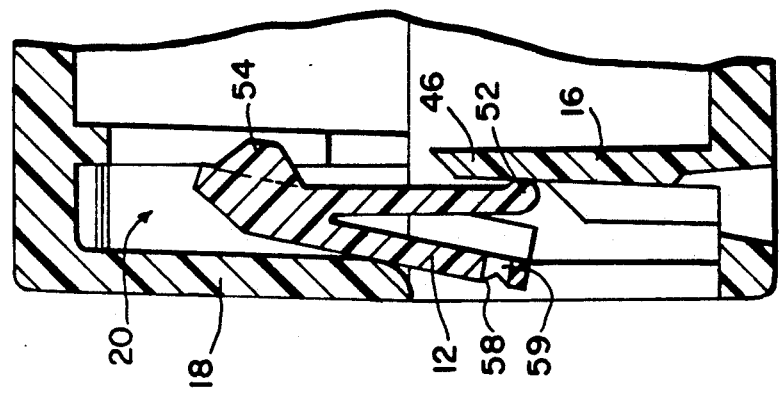
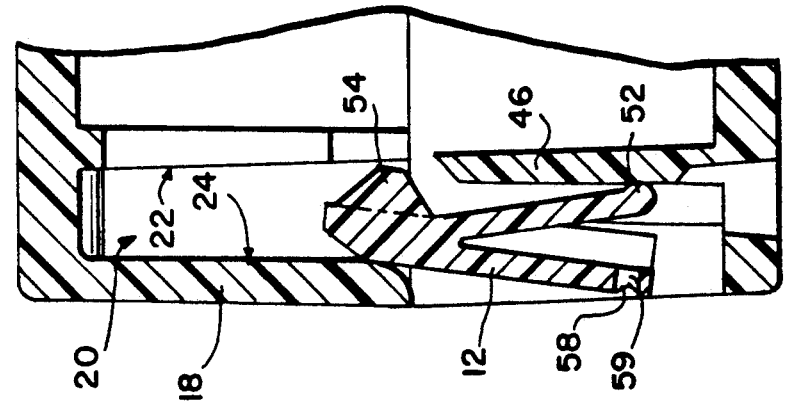

VIDEO TAPE CASSETTE WITH A REUSABLE RECORDING ENABLE/DISABLE SLIDE TAB

BACKGROUND OF THE INVENTION

1. Field of the Invention

The present invention relates to a reuseable write enable/disable indicator, and more particularly, to a write enable/disable tab on a tape cassette, particularly a video tape cassette, which can be positioned to prevent recording of video or audio signals on the tape cassette.

2. Description of the Related Art

Audio and video signals are conventionally recorded on tape cassettes by accessing a magnetic tape through an opening on one side (or front) of the cassette. On the opposite side (or rear) of the cassette, one or two (in the case of audio cassettes) write enable tabs are located. These tabs are conventionally formed as an integral part of the cassette shell, but are attached on only one side of a rectangle. The location and size of the tab, as well as the distance the tab may bend in response to a specific force, like other dimensions and specifications of video tape cassettes are determined by industry standards. Examples of typical video tape cassettes can be found in U.S. Pat. Nos. 4,173,319 and 4,484,248. A sensing mechanism is included in most tape cassette recording equipment to sense whether the write enable tab is in place on the cassette inserted into the recording equipment. When it is desired to prevent accidental erasure of a tape's contents, the conventional tab or tabs on the tape cassette are bent and broken off.

As a result, if it is subsequently decided to record over the contents of the tape, which typically is a frequent occurrence, it is necessary to place a piece of tape over the opening(s) in the cassette shell so that the sensing mechanism in the recording equipment does not sense any opening in the cassette shell. This is a cumbersome process which doesn't always work. For example, the sensing mechanism may push the tape into the opening. In addition, the procedure may need to be repeated fairly often if the tape used to cover the opening loses its adhesiveness and falls off the cassette shell. If this occurs while the cassette is in recording or playback equipment, an additional drawback arises from the possibility of the loosened tape damaging the recording or playback equipment.

As described above, the conventional technique for indicating "write disable" of a tape cassette is both awkward and relatively permanent. Thus, it is likely that when only a temporary "write disable" is desired, the write enable tab is left in place and the possibility of erasure of the tape's contents becomes an accepted risk.

SUMMARY OF THE INVENTION

An object of the present invention is to provide a write enable tab which is reuseable.

Another object of the present invention is to provide a reuseable write enable tab for a video cassette without any changes in conventional design and performance specifications.

Yet another object of the present invention is to provide a write enable tab which remains attached to a tape cassette shell when moved to a write disabled position.

A further object of the present invention is to provide a write enable tab which is easily moved between two positions, one of which enables writing of a signal onto a tape cassette and the other of which disables writing on the tape cassette.

The above-mentioned objects are attained by providing a write enable indicator for a signal storage unit, including movable means for enabling recording of a signal in the signal storage unit when the movable means is in a first position and for disabling the recording of the signal on the signal storage unit when the movable means is in a second position. Also included is retaining means for retaining said movable means in the second position and for permitting the movable means to repeatedly move between the first and second positions in response to an external force.

In one embodiment of the present invention, the write enable indicator is used on a tape cassette comprising a shell substantially surrounding a signal storage element. Retaining means are preferably formed as an integral part of the shell of the tape cassette. The movable means preferably includes sliding means with a central body, extensions and internal and external surfaces and movement retarding means formed by a flexible member attached at a first end to the internal surface of the sliding means. The retaining means preferably includes first and second walls having respective first and second surfaces facing each other to form a cavity therebetween. The first surface of the first wall preferably includes two depressions separated along a first axis. The sliding means moves along the first axis from the first position to the second position in response to the external force. The flexible member preferably includes a second end projecting into the first and second depressions when the sliding means is in the first and second positions, respectively.

These objects, together with other objects and advantages which will be subsequently apparent, reside in the details of construction and operation as more fully hereinafter described and claimed, reference being had to the accompanying drawings forming a part hereof wherein like reference numerals refer to like parts throughout.

BRIEF DESCRIPTIONS OF THE DRAWINGS

FIGS. 3A-3D are cross sectional views taken along line 3—3 in FIG. 2, illustrating a write enable tab according to the present invention in write enable and write disable positions and two intermediate positions therebetween;

DESCRIPTION OF THE PREFERRED EMBODIMENT

Figure 1:
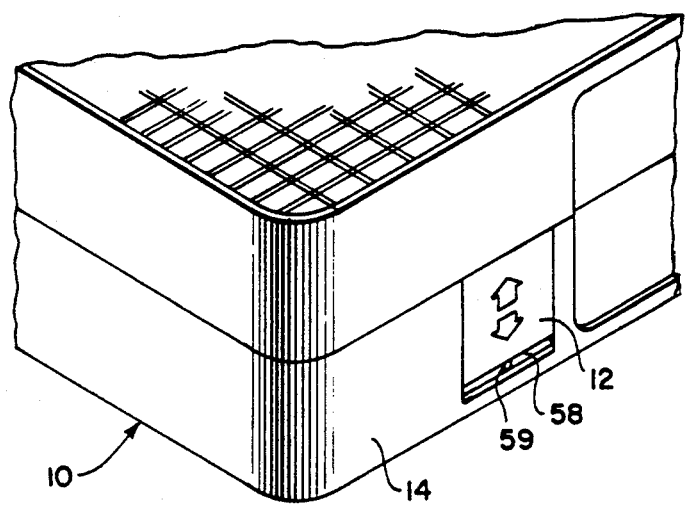
FIG. 1 is a perspective view of an external corner of a videotape cassette including a write enable tab according to the present invention.
Figure 2:
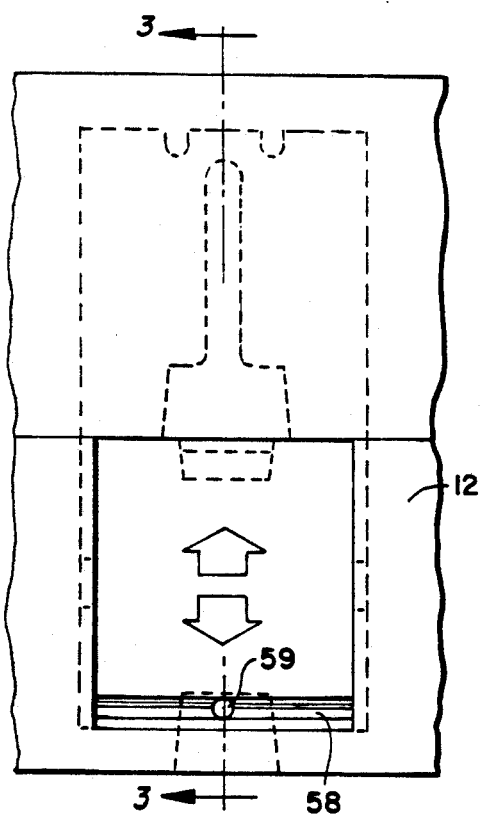
FIG. 2 is a front view of the write enable indicator according to the present invention.
Figure 3A:
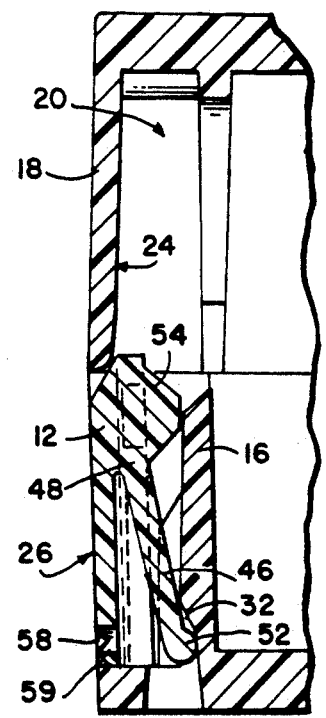

The present invention is most easily applied to a videotape cassette, such as a VHS standard tape cassette which is conventionally manufactured with a single write enable tab covering a majority of a rectangular opening in the shell of the tape cassette. A VHS videotape cassette has a relatively large write enable tab compared to other commonly used signal storage units such as audio tape cassettes and floppy diskettes and has been used for illustration in the drawings. In the case of the VHS videotape cassette, a write enable indicator is positioned as illustrated in FIG. 1. The tape cassette shell 10 substantially surrounds two spools holding magnetic tape (not shown) which acts as a signal storage element. According to the present invention, a write enable tab 12 is formed of a single piece of moldable material, preferably acetal for lubricity, and preferably having a color such as red contrasting with the dark color of the video cassette shell 10. Initially, the write enable tab 12 is positioned as illustrated in FIGS. 1, 2 and 3A. The write enable tab 12 provides movable means for enabling the recording of a signal on the signal storage element (magnetic tape) in the signal storage unit (cassette) when the movable means is in the first position illustrated in FIGS. 1, 2 and 3A. The position of the write enable tab 12 may be detected in any conventional manner, including exerting an external force against the tab 12 using a sensor element which will not significantly move the tab 12, due to the relatively small force, e.g., no more than 100 grams, which is typically applied.

The rear surface 14 of the tape cassette 10 has two walls, an internal wall 16 and an external wall 18, integrally formed as part of the cassette shell 10. A narrow cavity 20 is formed between a first surface 22 of the internal wall 16 and a second surface 24 of the external wall 18. The walls 16 and 18 form retaining means for retaining the write enable tab 12 in the first and second positions and for permitting the write enable tab to repeatedly move between the first and second positions. The internal wall 16 is formed sufficiently close to the external wall 18 so that the internal wall 16 does not intrude on the space allocated for the tape and spools.

The write enable tab 12 is moved from the first position, illustrated in FIG. 3A to the second position illustrated in FIG. 3D by exerting an external force on the external surface 26 of the write enable tab 12. The external force is exerted inwards and upwards on the write enable tab 12 so that the write enable tab 12 leaves the plane of the external wall 18 and moves to the position illustrated in FIG. 3B. As the force continues to be exerted, the write enable tab 12 moves to the position illustrated in FIG. 3C and continues moving until it stops in the second position illustrated in FIG. 3D.

Figure 4:
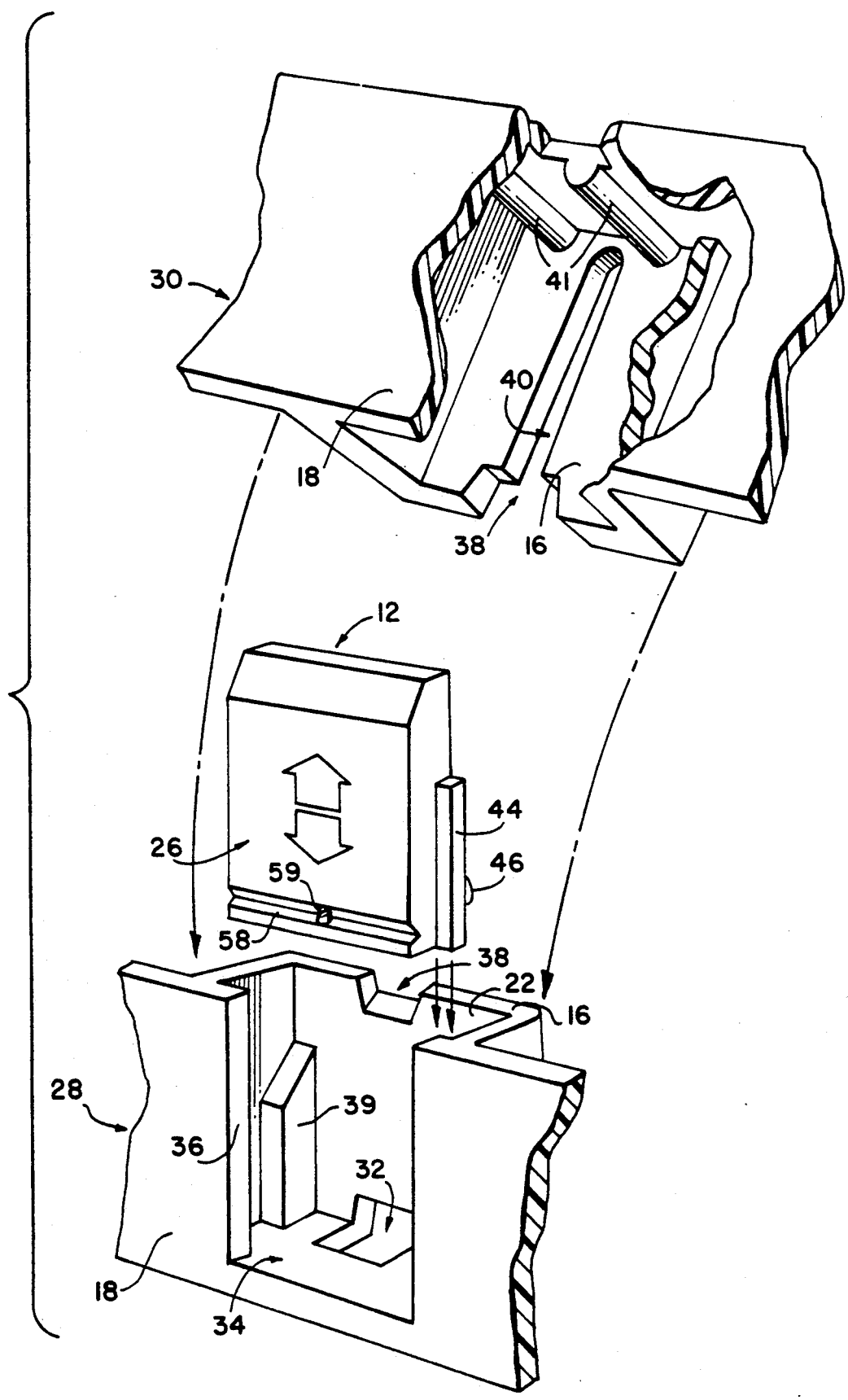
FIG. 4 is an exploded perspective view of a write enable indicator according to the present invention.

As illustrated in FIG. 4, the cassette shell 10 is formed from two halves 28 and 30, preferably injected molded plastic. The lower half or base 28 includes a first depression or opening 32 in the first or inner wall 16 and a large opening 34 defined by edges 36 of the second or outer wall 18. The lower half 28 also includes part of a second depression or opening 38 and E-ribs 39 which are formed as part of the inner wall 16 to force the tab outwards until it is flush with the outer wall 18 when it fills the opening 34. The opening 38 is further defined by the upper half or cover 30 which also includes a slot 40 in the first wall 16 and stops 41 on the top of the cover 30.

Figure 5:
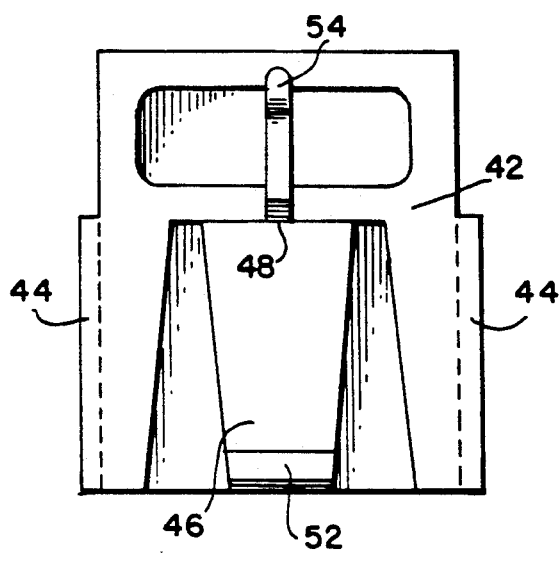
FIG. 5 is a rear view of a tab used in a write enable indicator according to the present invention.
Figure 6:
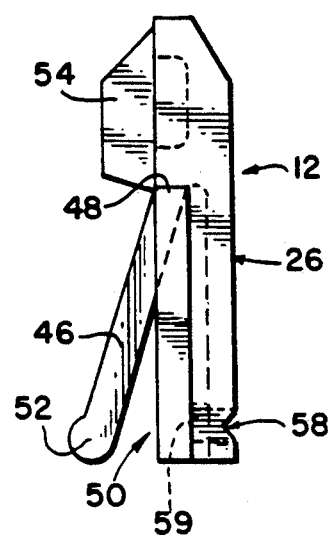
FIG. 6 is a side view of a tab used in a write enable indicator according to the present invention.
Figure 7:
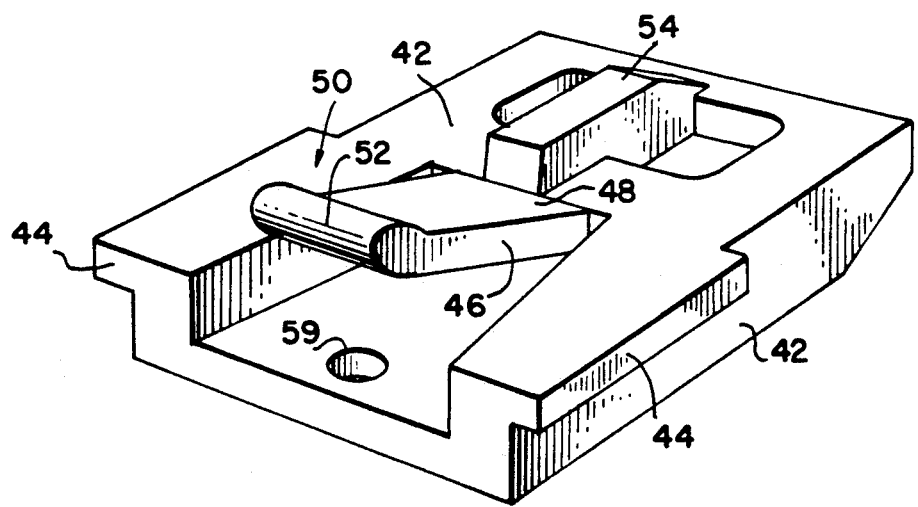
FIG. 7 is a perspective view of a tab used in a write enable indicator according to the present invention.

As illustrated in FIGS. 5-7, the write enable tab 12 includes a central body 42 and extensions 44 which are pressed against the second surface 24 (FIGS. 3A and 3B) of the second wall 18 by a flexible member 46. The flexible member 46 has a first end 48 attached to the internal surface 50 of the central body 42 and a second end 52 which exerts an internal force against the first surface 22 (FIG. 4) of the first wall 16. As illustrated in FIGS. 3B and 3C, the flexible member 46 is flexed as the write enable tab 12 is moved from the first position in FIG. 3A to the second position FIG. 3D. In the first and second positions, the flexible member 46 projects the second end 52 into the first and second depressions 32 and 38, respectively, thereby holding the write enable tab 12 in place. When used in a conventional VHS video cassette, the flexible member 46 withstands the force exerted by the sensor element in the first position (illustrated in FIG. 3A) to enable writing on the video cassette. The write enable tab 12 also includes a projection 54 which extends into the slot 40. The corners of the projection 54 may be rounded as illustrated at the top of FIG. 5 or squared as illustrated in the center of FIG. 5. The projection 54 and slot 40 form first and second alignment means which direct the write enable tab 12 to move along a first axis between the first and second positions. As described above, the flexible member 46 exerts the internal force along a second axis which intersects the first axis.

As best seen in FIG. 4, the external surface 26 of the write enable tab 12 includes a notch 58 or a pinhole 59, or both, which provide engagement means for a stiff object, such as a fingernail in the notch 58 or a ballpoint pen in the pinhole 59, to exert a downward or upward force on the write enable tab 12. The stops 41 (FIG. 4) are included to ensure that the notch 58 or pinhole 59 is exposed when the majority of the write enable tab 12 has been moved to the position illustrated in FIG. 3D, out of the opening 34 and offset from the plane of the external wall 18. This arrangement allows the write enable tab 12 to be easily moved from the second position illustrated in FIG. 3D to the first position illustrated in FIG. 3A to again enable writing of a signal onto the signal storage element, i.e., on magnetic tape in the tape cassette 10. The notch 58 and pinhole 59 are preferable to a positive projection extending from the external surface 26 of the tab 12, because they reduce the chance of accidental movement by the cassette user.

The above write enable/disable indicator is particularly suitable for video tape cassettes because it is readily adaptable to existing video tape cassette specifications, easy to manufacture of a moldable material and easy to assemble into the video tape cassette cover and base shell halves for mass production.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art, from the disclosure of this invention, it is not desired to limit the invention to the exact construction and operation illustrated and described.

For example, it may be possible to "retrofit" existing VCR cassettes by manufacturing inserts which fit into the space left by a broken conventional tab and which include a write enable tab and tracks to hold the tab in place at all four (4) positions illustrated in FIGS. 3A-3D. The present invention could also be applied to write enable tabs used on audio cassettes. In addition, commonly used floppy diskettes, e.g., 5¼ inch diskettes, have a write enable notch which is covered by tape when it is desired to prevent writing on the diskette. If a write enable indicator according to the present invention was used in this application, the tab would be moved to cover the opening to disable writing, instead of being moved out of the opening to disable writing.

Accordingly, suitable modifications and equivalents may be resorted to, all falling within the scope and spirit of the invention.

What is claimed is:

1. A write-enable indicator for a tape cassette having a tape cassette housing with a top cover shell half and a lower base shell half, the tape cassette housing forming an elongated front surface through which the tape contained by the tape cassette housing is accessed, an elongated rear surface opposite the front surface, side surfaces, and top and bottom surfaces, the write enable indicator comprising:

(a) movable means for enabling recording of a signal on the tape when said movable means is in a first position and for disabling the recording of a signal on the tape when said movable means is in a second position;

(b) retaining means for retaining said movable means in the first and second positions and for permitting said movable means to repeatedly move between the first and second positions in response to an external force, wherein said movable means includes
      sliding means for moving between the first and second positions along a first axis; and
      movement retarding means for retarding the movement of said sliding means, said movement retarding means cooperating with said retaining means to prevent said sliding means from moving from the first and second positions except when the external force is applied;

wherein said retaining means includes
      a first wall of the tape cassette housing, said first wall having a first surface; and
      a second wall of the tape cassette housing, having a second surface facing the first surface of the first wall to form a cavity therebetween, wherein said sliding means moves between the first and second positions by sliding between the first and second surfaces, wherein the movable means and retaining means are located in the rear surface of the cassette housing, wherein the movable means is movable along a first axis in the transverse direction on the tape cassette housing rear surface between the first enabling position and the second disabling position, wherein said movement retarding means exerts an internal force along a second axis different from the first axis to produce friction between said retaining means and said sliding means at least when said sliding means is in the first and second positions, wherein the first surface of the first wall includes two depressions separated along the first axis, and wherein said movement retarding means comprises a flexible member having a first end attached to said sliding means and a second end projecting into the first and second depressions when said sliding means is in the first and second positions, respectively.

2. A write enable indicator as recited in claim 1 wherein said second wall is an external wall of the tape cassette housing and includes an opening defined by edges of said second wall, wherein said first wall includes first alignment means for directing said sliding means along the first axis, and wherein said sliding means includes
      a central body having an internal surface attached to said flexible member and having an external surface exposed by the opening in said second wall,
      extensions, integral with said central body, extending beyond two of the edges of said second wall on opposite sides of the central body and contacting the second surface of the second wall; and second alignment means for interacting with said first alignment means to direct said sliding means along the first axis.

3. A write enable indicator as recited in claim 2, wherein the external force is exerted by a stiff object, and wherein said sliding means further comprises engagement means for engaging the stiff object to transmit the external force to said central body.

4. A write enable indicator as recited in claim 3, wherein said engagement means is a notch in the external surface of said central body.

5. A write enable indicator as recited in claim 4, wherein said sliding means substantially fills the opening in said second wall when said sliding means is in the first position and a majority of said sliding means, excluding the notch, is removed from the opening in said second wall when the sliding means is in the second position.

6. A write enable indicator as recited in claim 5, wherein said tape cassette is a video tape cassette.

7. The indicator as recited in claim 1, wherein the first position is in a first plane and the second position is in a second plane.

8. A write enable indicator for a video tape cassette formed from plastic injection molded into a cover and a base, the video tape cassette having a front surface through which magnetic tape contained by the video tape cassette is accessed and a rear surface opposite the front surface, the write enable indicator being located near a corner of the video tape cassette on the rear surface thereof, said write enable indicator comprising:

internal walls of the cover and base of the video tape cassette, each of said internal walls having a first surface facing outwards, the first surface of said internal wall of the base having a bottom end with a first depression and a top end forming part of a second depression, the first surface of said internal wall of the base containing E-ribs projecting outwards, the first surface of said internal wall of the cover having a bottom end containing a remaining part of the second depression and having an elongated slot extending from the second depression towards a top end of said internal wall of the cover;

external walls of the cover and base of the video tape cassette, each having a second surface facing the first surface of said internal walls, said external wall of the base having a rectangular opening defined by edges of said external wall; and a sliding member, having a rectangular central body with an internal surface facing the first surface of said internal walls and an external surface substantially filling the rectangular opening in said external wall of the base, extensions projecting beyond the edges of the rectangular opening in said external wall of the base and a flexible member projecting into the first depression, when said sliding member is in a first position, the flexible member forcing the extensions against the second surface of said external wall of the base when said sliding member is in the first position, said sliding member movable upwards and inwards from the first position to a second position in which a majority of said sliding member is positioned behind said external wall of the cover, the flexible member projecting into the second depression and forcing the external surface of said sliding member against the second surface of said external wall of the cover when the sliding member is in the second position, the external surface of said sliding member having a notch and a pinhole accessible via the rectangular opening when said sliding member is in the second position, the internal surface of said sliding member having a projection projecting into the slot in said internal wall of the cover when said sliding member is in the second position.

9. A write enable indicator as recited in claim 8, wherein said external walls have a first color, and wherein said sliding member is formed of acetal and has a second color contrasting with the first color.

10. The indicator as recited in claim 8, wherein the first position is in a first plane and the second position is in a second plane.

11. A write-enable indicator for a tape cassette having a tape cassette housing with a tape cover shell half and a lower base shell half, the tape cassette housing forming an elongated front surface through which the tape contained by the tape cassette housing is accessed, an elongated rear surface opposite the front surface, side surfaces, and top and bottom surfaces, the write enable indicator comprising:

(a) movable means for enabling recording of a signal on the tape when said movable means is in a first position and for disabling the recording of a signal on the tape when said movable means is in a second position; and, (b) retaining means for retaining said movable means in the first and second positions and for permitting said movable means to repeatedly move between the first and second positions in response to an external force, wherein said movable means includes
sliding means for moving between the first and second positions along a first axis; and
movement retarding means for retarding the movement of said sliding means, said movement retarding means cooperating with said retaining means to prevent said sliding means from moving from the first and second positions except when the external force is applied;

wherein said retaining means includes
a first wall of the tape cassette housing, said first wall having a first surface; and
a second, external wall of the tape cassette housing, having a second surface facing the first surface of the first wall to form a cavity therebetween, wherein the movable means and retaining means are located in the rear surface of the cassette housing, wherein the slidable means is movable along an axis in the transverse direction on the tape cassette housing rear surface between the first and second positions by sliding between the first and second surfaces, wherein said movement retarding means exerts an internal force along a second axis different from the first axis to produce friction between said retaining means and said sliding means at least when said sliding means is in the first and second positions, wherein the first surface of the first wall includes two depressions separated along the first axis, and wherein said movement retarding means includes a flexible member having a first end attached to said sliding means and a second end projecting into the first and second depressions when said sliding means is in the first and second positions, respectively, wherein said first wall includes first alignment means for directing said sliding means along the first axis, wherein a single opening is formed in the second external wall of the base shell half for applying external force to the movable means and thereby moving the movable means between the first and second positions and wherein said sliding means includes
a central body having an internal surface attached to said flexible member and having an external surface exposed by the opening in said second external wall;
extension, integral with said central body, extending beyond two of the edges of said second wall on opposite sides of the central body and contacting the second surface of the second wall; and
second alignment means for interacting with said first alignment means to direct said sliding means along the first axis.

12. The indicator as recited in claim 11, wherein the first position is in a first plane and the second position is in a second plane.

13. A write-enable indicator for a tape cassette having a tape cassette housing with a top cover shell half and a lower base shell half, the tape cassette housing forming an elongated front surface through which the tape contained by the tape cassette housing is accessed, an elongated rear surface opposite the front surface, side surfaces, and top and bottom surfaces, the write enable indicator comprising:

(a) movable means for enabling recording of a signal on the tape when said movable means is in a first position and for disabling the recording of a signal on the tape when said movable means is in a second position;

(b) retaining means for retaining said movable means in the first and second positions and for permitting said movable means to repeatedly move between the first and second positions in response to an external force, wherein the movable means and retaining means are located in the rear surface of the cassette housing, wherein the retaining means includes a first cavity portion formed by an internal wall adjacent the base shell half rear surface facing an external wall at the base shell half rear surface and a second cavity portion formed by an internal wall adjacent the cover shell half rear surface facing an external wall at the cover shell half rear surface, wherein the movable means is movable along a first axis in the transverse direction on the tape cassette housing rear surface between the first enabling position located in the first portion and the second enabling position located in the second portion;

(c) flexible movement retarding means which exerts and internal force along a second axis different from the first axis for retarding the movement of said movable means; and (d) means, formed on the retaining means along the first axis, for cooperating with the movement retarding means only in the first and second positions, wherein said movement retarding means cooperates with said cooperating means to prevent said movable means from moving from the first and second positions except when the external force is applied, and wherein the first position is in a first plane and the second position is in a second plane.

14. A write-enable indicator for a tape cassette having a tape cassette housing with a top cover shell half and a lower base shell half, the tape cassette housing forming an elongated front surface through which the tape contained by the tape cassette housing is accessed, an elongated rear surface opposite the front surface, side surfaces, and top and bottom surfaces, the write enable indicator comprising:

(a) movable means for enabling recording of a signal on the tape when said movable means is in a first position and for disabling the recording of a signal on the tape when said movable means is in a second position; and (b) retaining means for retaining said movable means in the first and second positions and for permitting said movable means to repeatedly move between the first and second positions in response to an external force, wherein the movable means and retaining means are located in the rear surface of the cassette housing, wherein the retaining means includes a first cavity portion formed by an internal wall adjacent the base shell half rear surface facing an external wall at the base shell half rear surface, and a second cavity portion formed by an internal wall adjacent the cover shell half rear surface facing an external wall at the cover shell half rear surface, wherein the movable means is movable along a first axis in the transverse direction on the tape cassette housing rear surface between the first enabling position located in the first cavity and the second enabling position located in the second cavity;

(c) movement retarding means which exerts an internal force along a second axis different from the first axis for retarding the movement of said movable means; and (d) means formed on the retaining means along the first axis, for cooperating with the movement retarding means only in the first and second positions, wherein said movement retarding means cooperates with said cooperating means to prevent said movable means from moving from the first and second positions except when the external force is applied, wherein the means for cooperating includes two depressions separated along the first axis, and wherein said movement retarding means comprises a flexible member having a first end attached to said movable means and a second end projecting into the first and second depressions when said movable means is in the first and second positions, respectively.

15. A write enable indicator as recited in claim 13 or 14, wherein said movable means comprises:

sliding means for moving between the first and second positions along a first axis.

16. A write enable indicator as recited in claim 15, wherein said retaining means is formed as an integral part of the tape cassette housing.

17. A write enable indicator as recited in claim 16, wherein said movement retarding means exerting an internal force along the second axis different from the first axis produces friction between said retaining means and said sliding means at least when said sliding means is in the first and second positions.

18. A write enable indicator as recited in claims 13 or 14, wherein said movable means and said movement retarding means are constructed of acetal.

19. A write enable indicator as recited in claims 13 or 14, wherein the external force is exerted by a stiff object, and wherein said movable means comprises engagement means for engaging the stiff object to transmit the external force to said movable means.

20. A write enable indicator as recited in claim 19, wherein said engagement means is a notch formed in an external surface of said movable means.

21. A write enable indicator as recited in claim 19, wherein said engagement means is a pinhole in an external surface of said movable means.

22. A write enable indicator as recited in claims 13 or 14, wherein said movable means is constructed of acetal.

23. A write enable indicator as recited in claims 13 or 14, wherein the tape cassette housing a first color, and the movable means has a second contrasting color, the movable means being substantially visible at the rear surface when in the first position and being substantially invisible at the rear surface when in the second position.

24. A write enable indicator as recited in claims 13 or 14, wherein a single opening is formed in the base shell half for applying external force to the movable means and thereby moving the movable means between the first and second positions.

25. A write enable indicator as recited in claims 13 or 14, wherein the movable means, when located in the first position, has an external surface substantially flush with the external surface of the cover shell half and base shell half to form the rear surface of the tape cassette housing.

26. A write enable indicator as recited in claims 13 or 14, wherein the tape cassette is a video tape cassette.

27. A write enable indicator as recited in claims 13 or 14, wherein the first cavity portion is integrally formed as part of the base shell half and the second cavity portion is integrally formed as part of the cover base shell half.

* * * * *